(12) United States Patent
Goleski

(10) Patent No.: US 10,113,615 B2
(45) Date of Patent: Oct. 30, 2018

(54) MULTI-SPEED TRANSMISSION

(71) Applicant: FORD GLOBAL TECHNOLOGIES, LLC, Dearborn, MI (US)

(72) Inventor: Gregory Daniel Goleski, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 891 days.

(21) Appl. No.: 14/033,121

(22) Filed: Sep. 20, 2013

(65) Prior Publication Data

US 2015/0087473 A1 Mar. 26, 2015

(51) Int. Cl.
*F16H 3/62* (2006.01)
*F16H 3/66* (2006.01)

(52) U.S. Cl.
CPC ............ *F16H 3/62* (2013.01); *F16H 3/66* (2013.01); *F16H 2200/006* (2013.01); *F16H 2200/0065* (2013.01); *F16H 2200/2012* (2013.01); *F16H 2200/2041* (2013.01); *F16H 2200/2043* (2013.01); *F16H 2200/2046* (2013.01)

(58) Field of Classification Search
CPC ............ F16H 3/62; F16H 2200/2012; F16H 2200/2041
USPC ........................................ 475/288, 330, 275
See application file for complete search history.

(56) References Cited

U.S. PATENT DOCUMENTS

| 7,101,305 | B2 * | 9/2006 | Tabata et al. ............... 475/296 |
| 7,527,576 | B2 | 5/2009 | Kamm et al. |
| 7,632,207 | B2 | 12/2009 | Kamm et al. |
| 7,645,208 | B2 | 1/2010 | Kamm et al. |
| 7,753,820 | B2 * | 7/2010 | Phillips et al. ............... 475/276 |
| 7,789,792 | B2 | 9/2010 | Kamm et al. |
| 7,841,960 | B2 * | 11/2010 | Baldwin ...................... 475/280 |
| 8,043,192 | B2 * | 10/2011 | Phillips et al. ............... 475/282 |
| 8,083,630 | B2 * | 12/2011 | Rice et al. .................... 475/280 |
| 8,409,045 | B1 * | 4/2013 | Mellet et al. ................. 475/280 |
| 8,506,442 | B2 * | 8/2013 | Mellet et al. ................. 475/276 |
| 8,523,729 | B2 * | 9/2013 | Hart et al. .................... 475/282 |

(Continued)

FOREIGN PATENT DOCUMENTS

DE 102010063571 A1 6/2012
DE 202013002494 U1 6/2013

OTHER PUBLICATIONS

H. Benford, M. Leising, The Lever Analogy: A New Tool in Transmission Analysis, 1982, Society of Automotive Engineers, Inc. 810102, p. 429-437.

(Continued)

*Primary Examiner* — David J Hlavka
(74) *Attorney, Agent, or Firm* — James Dottavio; Brooks Kushman P.C.

(57) ABSTRACT

A transmission gearing arrangement has four simple planetary gear sets and five or six shift elements. One embodiment has two brakes and three clutches and produces eight speeds by selective engagement of various combinations of three of the shift elements. A second embodiment has two brakes and four clutches and produces nine speeds by selective engagement of various combinations of four of the shift elements. A third embodiment has two brakes and four clutches and produces ten speeds by selective engagement of various combinations of four of the shift elements.

15 Claims, 3 Drawing Sheets

(56) References Cited

U.S. PATENT DOCUMENTS 8,821,336 B2 * 9/2014 Wilton et al. .................. 475/280
2009/0192009 A1 7/2009 Phillips et al.

OTHER PUBLICATIONS

Chinese Office Action dated Jan. 20, 2018 for Chinese Application No. 201410464831.4, 5 pages.

* cited by examiner

MULTI-SPEED TRANSMISSION

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

SUMMARY OF THE DISCLOSURE

Figure 1:
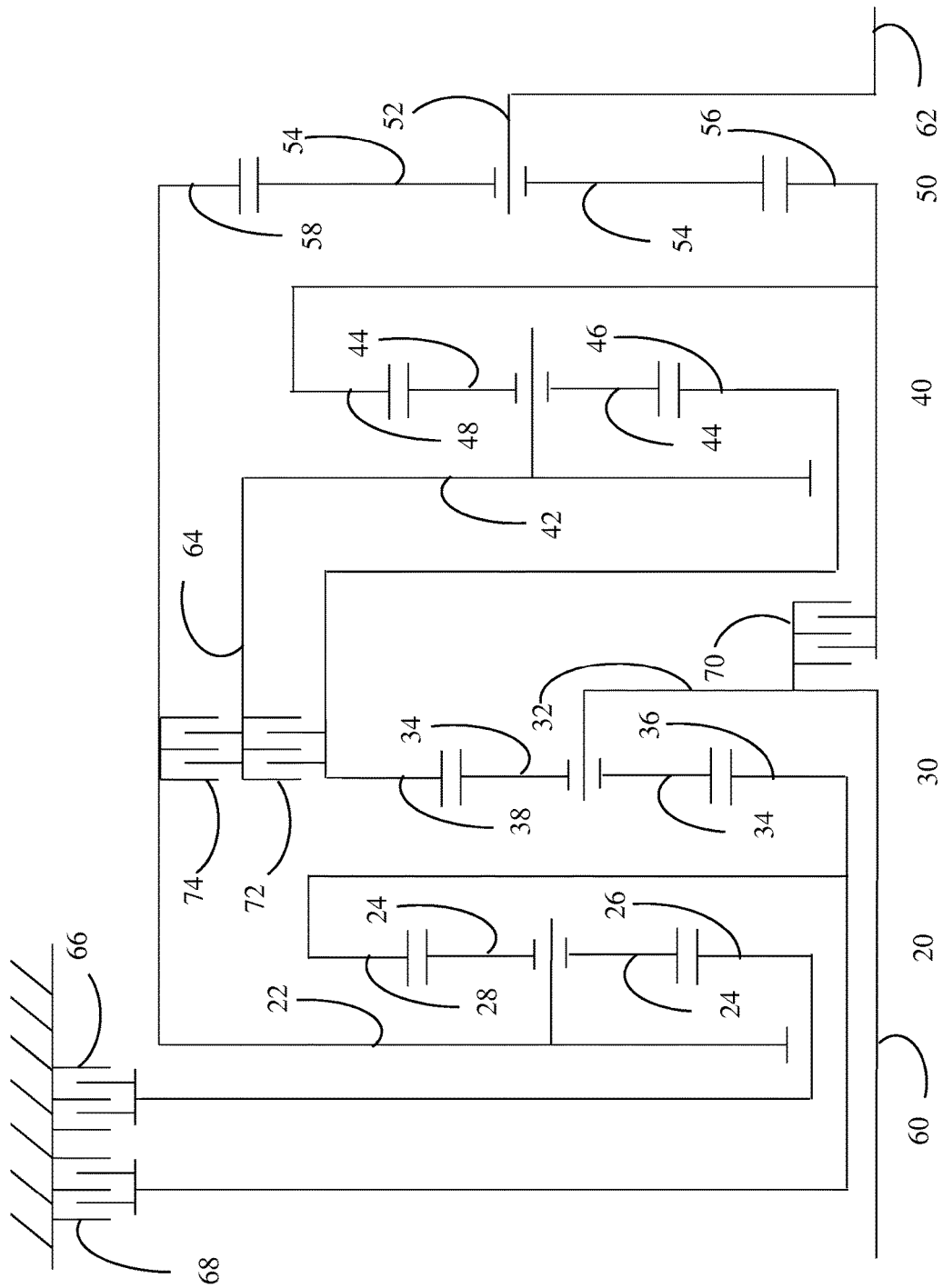
FIG. 1 is a schematic diagram of a first transmission gearing arrangement.

A transmission has four simple planetary gear sets with specified connections. The second sun gear is fixedly coupled to the first ring gear. The second carrier is fixedly coupled to the input. The third sun gear is coupled, either fixedly or selectively, to the second ring gear. The fourth sun gear is coupled, either fixedly or selectively, to the third ring gear. The fourth carrier is fixedly coupled to the output. The fourth ring gear is fixedly coupled to the first carrier. First and second brakes selectively hold the first and second sun gears, respectively, against rotation. A first clutch selectively couples the input to the fourth sun gear.

In another embodiment, a transmission has four simple planetary gear sets with specified connections. The second sun gear is fixedly coupled to the first ring gear. The second carrier is fixedly coupled to the input. The third sun gear is coupled, either fixedly or selectively, to the second ring gear. The third carrier is coupled, either fixedly or selectively, to an intermediate shaft. The fourth sun gear is coupled, either fixedly or selectively, to the third ring gear. The fourth carrier is fixedly coupled to the output. The fourth ring gear is fixedly coupled to the first carrier. First and second brakes selectively hold the first and second sun gears, respectively, against rotation. A first clutch selectively couples the input to the fourth sun gear. A second clutch selectively couples the intermediate shaft to the second ring gear.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotating elements are fixedly coupled to one another if they are constrained to rotate as a unit in all operating conditions. Rotating elements can be fixedly coupled by spline connections, welding, press fitting, machining from a common solid, or other means. Slight variations in rotational displacement between fixedly coupled elements can occur such as displacement due to lash or shaft compliance. One or more rotating elements that are all fixedly coupled to one another may be called a shaft. In contrast, two rotating elements are selectively coupled by a shift element when the shift element constrains them to rotate as a unit whenever it is fully engaged and they are free to rotate at distinct speeds in at least some other operating condition. A shift element that holds a rotating element against rotation by selectively connecting it to the housing is called a brake. A shift element that selectively couples two or more rotating elements to one another is called a clutch. Shift elements may be actively controlled devices such as hydraulically or electrically actuated clutches or brakes or may be passive devices such as one way clutches or brakes. Two rotating elements are coupled if they are either fixedly coupled or selectively coupled.

A gearing arrangement is a collection of shafts and shift elements configured to impose specified speed relationships among the shafts. Some speed relationships, called fixed speed relationships, are imposed regardless of the state of any shift elements. Other speed relationships, called selective speed relationships, are imposed only when particular shift elements are fully engaged. The speed of a shaft is positive when the shaft rotates in one direction and negative when the shaft rotates in the opposite direction. A proportional speed relationship exists between a first shaft and a second shaft when the ratio of their speeds is constrained to be a predetermined value. A proportional speed relationship between a first shaft and a second shaft is an underdrive relationship if the ratio of the second shaft speed to the first shaft speed is between zero and one. Similarly, a proportional speed relationship between a first shaft and a second shaft is an overdrive relationship if the ratio of the second shaft speed to the first shaft speed is greater than one. A linear speed relationship exists among an ordered list of shafts when i) the first and last shaft in the ordered list are constrained to have the most extreme speeds, ii) the speeds of the remaining shafts are each constrained to be a weighted average of the speeds of the first and last shafts, and iii) when the speeds of the shafts differ, they are constrained to be in the listed order, either increasing or decreasing.

FIG. 1 depicts a transmission that provides eight forward and one reverse speed ratios between input 60 and output 62.

Input 60 may be driven by an internal combustion engine or other prime mover. A launch device such as torque converter or launch clutch may be employed between the prime mover and input 60 permitting the engine to idle while the vehicle is stationary and a transmission ratio is selected. Output 62 drives the vehicle wheels, preferably via a differential that allows a slight speed difference between left and right wheels while the vehicle goes around a corner.

The transmission of FIG. 1 utilizes four simple planetary gear sets 20, 30, 40, and 50. A planet carrier 22 rotates about a central axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the same axis as the carrier. Gear sets 30, 40, and 50 are similarly structured. A suggested ratio of gear teeth for each planetary gear set is listed in Table 1.

TABLE 1

| | |
|---|---|
| Ring 28/Sun 26 | 1.50 |
| Ring 38/Sun 36 | 1.65 |
| Ring 48/Sun 46 | 1.80 |
| Ring 58/Sun 56 | 3.00 |

A simple planetary gear set is a type of gearing arrangement that imposes a fixed linear speed relationship among the sun gear, the planet carrier, and the ring gear. Other known types of gearing arrangements also impose a fixed linear speed relationship among three rotating elements. For example, a double pinion planetary gear set imposes a fixed linear speed relationship among the sun gear, the ring gear, and the planet carrier.

Carrier 32 is fixedly coupled to input 60. Carrier 52 is fixedly coupled to output 62. Carrier 22 is fixedly coupled to ring gear 58. Ring gear 28 is fixedly coupled to sun gear 36. Ring gear 38 is fixedly coupled to sun gear 46. Carrier 42 is fixedly coupled to intermediate shaft 64. Finally, ring gear 48 is fixedly coupled to sun gear 56. Sun gear 26 is selectively held against rotation by brake 66. The combination of ring gear 28 and sun gear 36 is selectively held against rotation by brake 68. Intermediate shaft 64 is selectively coupled to the combination of ring gear 38 and sun gear 46 by clutch 72 and selectively coupled to the combination of carrier 22 and ring gear 58 by clutch 74. Finally, input 60 is selectively coupled to the combination of ring gear 48 and sun gear 56 by clutch 70. The combination of gear set 40 and clutch 72 operatively selectively couples ring gear 38 to sun gear 56 because, whenever clutch 72 is engaged gear set 40 rotates as a unit. A clutch between any two elements of gear set 40 would selectively force gear set 40 to rotate as a unit.

As shown in Table 2, engaging the shift elements in combinations of three establishes eight forward speed ratios and one reverse speed ratio between input 60 and output 62. An X indicates that the shift element is required to establish the speed ratio. When the gear sets have tooth numbers as indicated in Table 1, the speed ratios have the values indicated in Table 2.

TABLE 2

| | 66 | 68 | 70 | 72 | 74 | Ratio | Step |
|---|---|---|---|---|---|---|---|
| Rev | X | X | | | X | −4.48 | 112% |
| 1st | X | X | X | | | 4.00 | |
| 2nd | X | X | | | X | 2.49 | 1.61 |
| 3rd | X | | | X | X | 1.43 | 1.74 |
| 4th | X | | | | X | 1.25 | 1.14 |
| 5th | X | | | X | | X | 1.09 | 1.21 |
| 6th | | | X | X | X | 1.00 | 1.09 |
| 7th | | X | X | | X | 0.86 | 1.16 |
| 8th | | X | | X | X | 0.62 | 1.38 |

Figure 2:
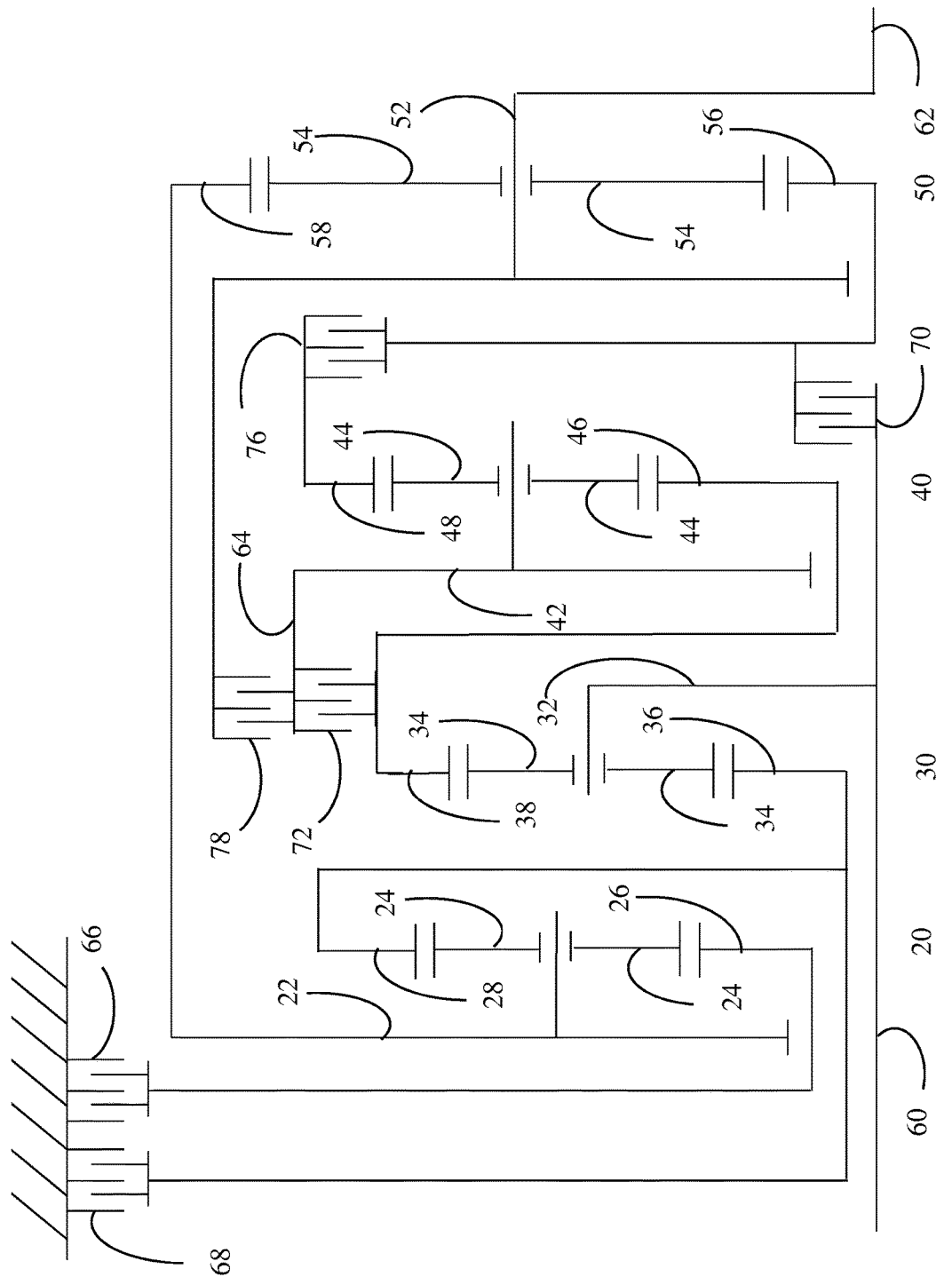
FIG. 2 is a schematic diagram of a second transmission gearing arrangement.

FIG. 2 depicts a transmission that provides nine forward and one reverse speed ratios between input 60 and output 62. The transmission of FIG. 2 utilizes four simple planetary gear sets 20, 30, 40, and 50. A suggested ratio of gear teeth for each planetary gear set is listed in Table 1.

Carrier 32 is fixedly coupled to input 60. Carrier 52 is fixedly coupled to output 62. Carrier 22 is fixedly coupled to ring gear 58. Ring gear 28 is fixedly coupled to sun gear 36. Ring gear 38 is fixedly coupled to sun gear 46. Finally, carrier 42 is fixedly coupled to intermediate shaft 64. Sun gear 26 is selectively held against rotation by brake 66. The combination of ring gear 28 and sun gear 36 is selectively held against rotation by brake 68. Input 60 is selectively coupled to the sun gear 56 by clutch 70. Intermediate shaft 64 is selectively coupled to the combination of ring gear 38 and sun gear 46 by clutch 72 and selectively coupled to output 62 by clutch 78. Finally, ring gear 48 is selectively coupled to sun gear 56 by clutch 76.

As shown in Table 3, engaging the shift elements in combinations of four establishes nine forward speed ratios and one reverse speed ratio between input 60 and output 62. An X indicates that the shift element is required to establish the speed ratio. An (X) indicates the clutch can be applied but is not required to establish a power flow path. For example, in 1st gear, brakes 66 and 68 and clutch 70 establish the power flow path between input 60 and output 62. Any one of the remaining shift elements can also be applied. Applying clutch 76 ensures that all single and two step shifts from 1st gear can be accomplished by engaging only one shift element and releasing only one shift element. When the gear sets have tooth numbers as indicated in Table 1, the speed ratios have the values indicated in Table 2.

TABLE 3

| | 66 | 68 | 70 | 72 | 76 | 78 | Ratio | Step |
|---|---|---|---|---|---|---|---|---|
| Rev | X | X | | | X | X | −2.74 | 69% |
| 1st | X | X | X | | (X) | | 4.00 | |
| 2nd | X | X | | X | X | | 2.49 | 1.61 |
| 3rd | X | | X | X | X | | 1.43 | 1.74 |
| 4th | X | | | X | X | X | 1.25 | 1.14 |
| 5th | X | | X | X | | X | 1.21 | 1.04 |
| 6th | X | | X | | X | X | 1.11 | 1.09 |
| 7th | | | X | X | X | X | 1.00 | 1.11 |
| 8th | | X | X | | X | X | 0.82 | 1.22 |
| 9th | | X | | X | (X) | X | 0.62 | 1.32 |

Figure 3:
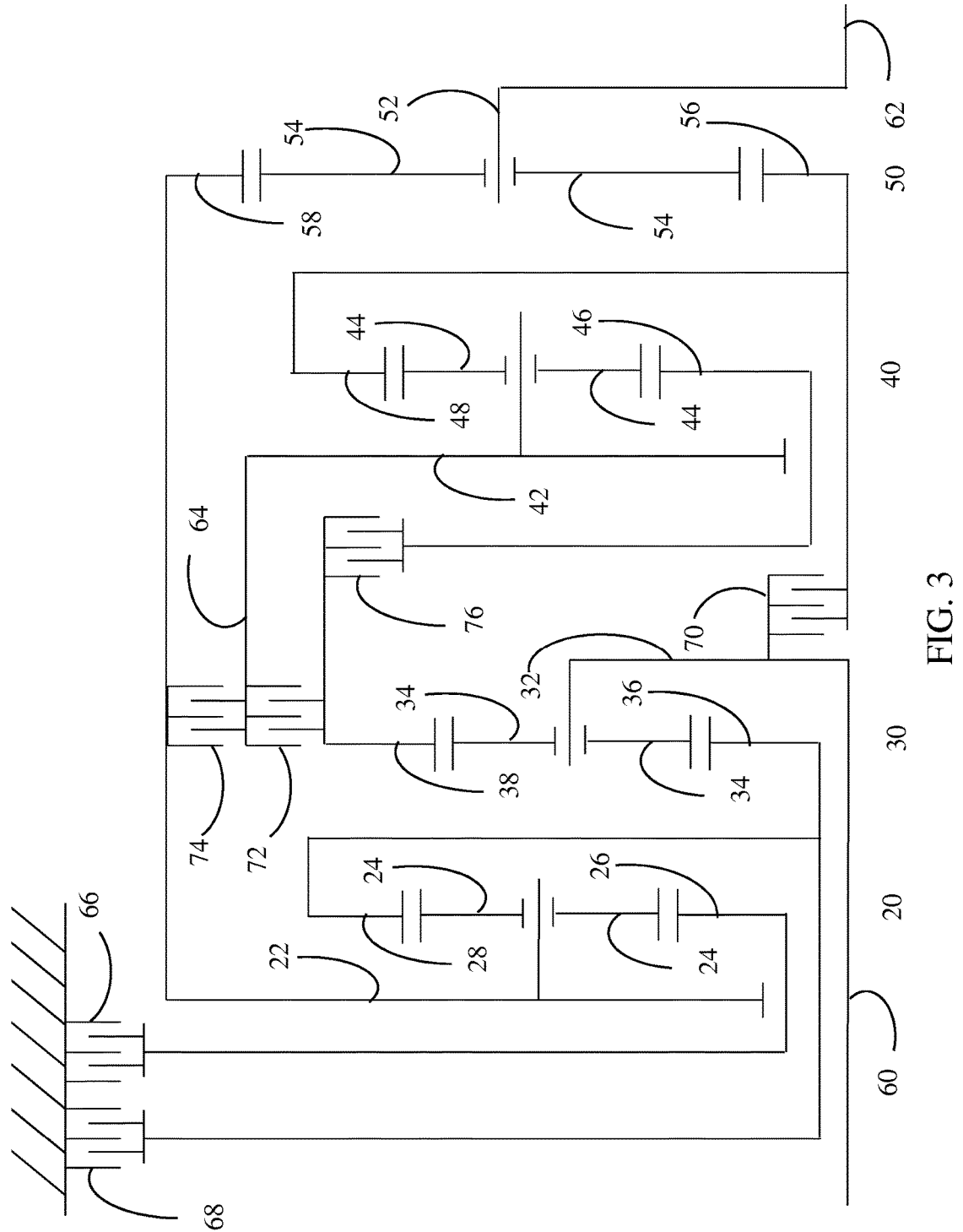
FIG. 3 is a schematic diagram of a third transmission gearing arrangement.

FIG. 3 depicts a transmission that provides ten forward and one reverse speed ratios between input 60 and output 62. The transmission of FIG. 3 utilizes four simple planetary gear sets 20, 30, 40, and 50. A suggested ratio of gear teeth for each planetary gear set is listed in Table 1.

Carrier 32 is fixedly coupled to input 60. Carrier 52 is fixedly coupled to output 62. Carrier 22 is fixedly coupled to ring gear 58. Ring gear 28 is fixedly coupled to sun gear 36. Carrier 42 is fixedly coupled to intermediate shaft 64. Finally, ring gear 48 is fixedly coupled to sun gear 56. Sun gear 26 is selectively held against rotation by brake 66. The combination of ring gear 28 and sun gear 36 is selectively held against rotation by brake 68. Intermediate shaft 64 is selectively coupled to the combination of ring gear 38 and sun gear 46 by clutch 72 and selectively coupled to the combination of carrier 22 and ring gear 58 by clutch 74. Input 60 is selectively coupled to the combination of ring gear 48 and sun gear 56 by clutch 70. Finally, ring gear 38 is selectively coupled to sun gear 46 by clutch 76.

As shown in Table 4, engaging the shift elements in combinations of four establishes ten forward speed ratios and one reverse speed ratio between input 60 and output 62. When the gear sets have tooth numbers as indicated in Table 1, the speed ratios have the values indicated in Table 4.

TABLE 4

|  | 66 | 68 | 70 | 72 | 74 | 76 | Ratio | Step |
|---|---|---|---|---|---|---|---|---|
| Rev | X | X |  |  | X | X | −4.48 | 112% |
| $1^{st}$ | X | X | X |  |  | (X) | 4.00 |  |
| $2^{nd}$ | X | X |  | X |  | X | 2.49 | 1.61 |
| $3^{rd}$ | X |  | X | X |  | X | 1.43 | 1.74 |
| $4^{th}$ | X |  |  | X | X | X | 1.25 | 1.14 |
| $5^{th}$ | X |  | X | X | X |  | 1.18 | 1.06 |
| $6^{th}$ | X |  | X |  | X | X | 1.09 | 1.08 |
| $7^{th}$ |  |  | X | X | X | X | 1.00 | 1.09 |
| $8^{th}$ |  | X | X |  | X | X | 0.86 | 1.16 |
| $9^{th}$ |  | X | X | X | X |  | 0.69 | 1.25 |
| $10^{th}$ |  | X |  | X | X | X | 0.62 | 1.10 |

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A transmission comprising:
an input;
an output;
a first simple planetary gear set having a first sun gear, a first ring gear, and a first planet carrier;
a second simple planetary gear set having a second sun gear fixedly coupled to the first ring gear, a second ring gear, and a second planet carrier fixedly coupled to the input;
a third simple planetary gear set having a third sun gear coupled to the second ring gear, a third ring gear, and a third planet carrier;
a fourth simple planetary gear set having a fourth sun gear coupled to the third ring gear, a fourth ring gear fixedly coupled to the first planet carrier, and a fourth planet carrier fixedly coupled to the output;
a first brake configured to selectively hold the first sun gear against rotation;
a second brake configured to selectively hold the second sun gear against rotation; and
a first clutch configured to selectively couple the input to the fourth sun gear.

2. The transmission of claim 1 wherein:
the third sun gear is fixedly coupled to the second ring gear; and
the fourth sun gear is fixedly coupled to the third ring gear.

3. The transmission of claim 2 further comprising a second clutch configured to operatively selectively couple the second ring gear to the fourth sun gear.

4. The transmission of claim 3 wherein the second clutch directly selectively couples the second ring gear to the third planet carrier.

5. The transmission of claim 1 wherein:
the third sun gear is fixedly coupled to the second ring gear; and
the fourth sun gear is selectively coupled to the third ring gear.

6. The transmission of claim 1 wherein:
the third sun gear is selectively coupled to the second ring gear; and
the fourth sun gear is fixedly coupled to the third ring gear.

7. The transmission of claim 1 further comprising a second clutch configured to selectively couple the second ring gear to the third planet carrier.

8. The transmission of claim 7 further comprising a third clutch configured to selectively couple the third planet carrier to the output.

9. The transmission of claim 7 further comprising a third clutch configured to selectively couple the third planet carrier to the fourth ring gear.

10. A transmission comprising:
an input;
an output;
an intermediate shaft;
a first simple planetary gear set having a first sun gear, a first ring gear, and a first planet carrier;
a second simple planetary gear set having a second sun gear fixedly coupled to the first ring gear, a second ring gear, and a second planet carrier fixedly coupled to the input;
a third simple planetary gear set having a third sun gear coupled to the second ring gear, a third ring gear, and a third planet carrier coupled to the intermediate shaft;
a fourth simple planetary gear set having a fourth sun gear coupled to the third ring gear, a fourth ring gear fixedly coupled to the first planet carrier, and a fourth planet carrier fixedly coupled to the output;
a first brake configured to selectively hold the first sun gear against rotation;
a second brake configured to selectively hold the second sun gear against rotation;
a first clutch configured to selectively couple the input to the fourth sun gear; and
a second clutch configured to selectively couple the intermediate shaft to the second ring gear.

11. The transmission of claim 10 further comprising a third clutch configured to selectively couple the intermediate shaft to the fourth ring gear.

12. The transmission of claim 11 wherein:
the third sun gear is fixedly coupled to the second ring gear;
the third planet carrier is fixedly coupled to the intermediate shaft; and
the fourth sun gear is fixedly coupled to the third ring gear.

13. The transmission of claim 11 wherein:
the third sun gear is selectively coupled to the second ring gear;
the third planet carrier is fixedly coupled to the intermediate shaft; and
the fourth sun gear is fixedly coupled to the third ring gear.

14. The transmission of claim 10 further comprising a third clutch configured to selectively couple the intermediate shaft to the output.

15. The transmission of claim 14 wherein:
the third sun gear is fixedly coupled to the second ring gear;
the third planet carrier is fixedly coupled to the intermediate shaft; and
the fourth sun gear is selectively coupled to the third ring gear.

* * * * *